United States Patent
Bissonnette et al.

(10) Patent No.: US 12,488,157 B2
(45) Date of Patent: Dec. 2, 2025

(54) SYSTEM AND METHOD FOR INSPECTING AND MANAGING ROADS

(71) Applicant: SOLUTIONS DAWAY INC., Brossard (CA)

(72) Inventors: Daniel Bissonnette, Brossard (CA); Guylaine Caux, Brossard (CA)

(73) Assignee: SOLUTIONS DAWAY INC., Brossard (CA)

(*) Notice: Subject to any disclaimer, the term of this patent is extended or adjusted under 35 U.S.C. 154(b) by 0 days.

(21) Appl. No.: 18/708,745

(22) PCT Filed: Dec. 21, 2022

(86) PCT No.: PCT/CA2022/051882
§ 371 (c)(1),
(2) Date: May 9, 2024

(87) PCT Pub. No.: WO2023/115217
PCT Pub. Date: Jun. 29, 2023

(65) Prior Publication Data
US 2024/0419850 A1    Dec. 19, 2024

Related U.S. Application Data

(60) Provisional application No. 63/292,139, filed on Dec. 21, 2021.

(51) Int. Cl.
G06F 30/13    (2020.01)

(52) U.S. Cl.
CPC .................................. *G06F 30/13* (2020.01)

(58) Field of Classification Search
CPC ............................................. G06F 30/13
(Continued)

(56) References Cited

U.S. PATENT DOCUMENTS 6,581,045 B1    6/2003    Watson
6,999,829 B2    2/2006    Bazzocchi et al.
(Continued)

OTHER PUBLICATIONS

NRC-CNRC (Timely Preventive Maintenance for Municipal Roads A Primer, 38 pages) (Year: 2003).*

(Continued)

*Primary Examiner* — Andre Pierre Louis
(74) *Attorney, Agent, or Firm* — Lavery, de Billy, L.L.P.; Gonzalo Lavin

(57) ABSTRACT

A method, system and computer readable medium for improving road quality indexes comprising, for each road R1 from a plurality of roads, obtaining two or more datasets comprising: design data, construction data, maintenance data, inspection data, environmental data; from one or more moments in the lifecycle of the road R1. Deriving best practices related to road construction and/or road maintenance is performed considering the obtained datasets. During an intervention performed on a road R2, altering in real-time execution parameters of the intervention is performed considering intervention data gathered in real-time during the intervention and the best practices. The intervention is one of construction or maintenance and the execution parameters include a choice of material for R2, a construction technique for R2, a maintenance technique for R2, a design choice for one or more structures of R2, design data related to a design phase of R2.

18 Claims, 14 Drawing Sheets

(58) Field of Classification Search
USPC .............................................................. 703/1
See application file for complete search history.

(56) References Cited

U.S. PATENT DOCUMENTS

| | | |
|---|---|---|
| 7,734,488 B2 | 6/2010 | Grussing et al. |
| 7,991,577 B2 | 8/2011 | Havener et al. |
| 8,681,036 B2 | 3/2014 | Beer et al. |
| 8,725,625 B2 | 5/2014 | Anderson et al. |
| 11,507,908 B2 | 11/2022 | Singh et al. |
| 11,823,368 B1 * | 11/2023 | Mohammad .......... G06T 7/0004 |
| 2007/0078695 A1 | 4/2007 | Zingelewicz et al. |
| 2008/0312990 A1 | 12/2008 | Byrne |
| 2011/0313808 A1 | 12/2011 | Kavanagh et al. |
| 2012/0123969 A1 * | 5/2012 | Messmer ........... G06Q 30/0283 |
| | | 705/400 |
| 2012/0221371 A1 | 8/2012 | Hegazy et al. |
| 2013/0339489 A1 | 12/2013 | Katara et al. |
| 2014/0330600 A1 | 11/2014 | Candas et al. |
| 2017/0103371 A1 | 4/2017 | Posavljak |
| 2018/0211350 A1 | 7/2018 | Wang et al. |
| 2021/0287459 A1 | 9/2021 | Cella et al. |
| 2022/0155796 A1 | 5/2022 | Haidar et al. |
| 2022/0309202 A1 | 9/2022 | Yang et al. |
| 2023/0199449 A1 * | 6/2023 | Katta ..................... H04W 4/44 |
| | | 370/310 |

OTHER PUBLICATIONS

Lazic et al. (From Road Condition Data Collection to Effective Maintenance Decision Making: 16 pages). (Year: 2003).*

Diego Hernandez Diaz, Gabriel Valtueña-Ramos, and Frank von Willert, Finding the right (of) way to efficient road operation and maintenance, Jul. 2021.

Timely Preventive Maintenance for Municipality Roads—A Primer, National Guide to Sustainable Municipal Infrastructure, issue No. 1.1, Apr. 2003.

Lazic et al, From Road Condition Data Collection to Effective Maintenance Decision Making, Saskatchewan Highways and Transportation Approach, Annual Conferenc of the Transportation Association of Canada, 2003.

* cited by examiner

SYSTEM AND METHOD FOR INSPECTING AND MANAGING ROADS

CROSS-REFERENCE TO RELATED APPLICATIONS

This patent application is a National Entry Application of PCT application No. PCT/CA2022/051882 filed on Dec. 21, 2022 and published in English under PCT Article 21(2), which itself claims benefit of U.S. provisional patent application Ser. No. 63/292,139, filed on Dec. 21, 2021. All documents above are incorporated herein in their entirety by reference.

TECHNICAL FIELD

The present invention relates to road construction and, more particularly, to road management enhancement.

BACKGROUND

Road design software solutions are generally developed according to a theoretical basis. Known software solutions use specific field data corresponding to a measurement taken at one specific time and a single location that often tries to match the degraded condition of the road as design criteria. Furthermore, known road maintenance is typically carried out on a theoretical basis, or based on visual observations or user complaints. In some cases, road ratings are based on the cracking rate per linear meter and ride comfort (IRI), which is insufficient.

The present disclosure provides at least partial solution to improving the manner in which roads are designed, constructed and/or maintained.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations herein relate to a method for improving one or more road quality indexes. The method comprises, for each road R1 from a plurality of roads, obtaining two of more datasets having: design data related to a design phase of the road R1; construction data related to a construction phase of the road R1; maintenance data related to maintenance activities performed at one or more moments in a lifecycle of the road R1; inspection data related to inspections performed at one or more moments in the lifecycle of the road R1; testing data related to tests performed regarding the road R1; and environmental data related to environmental measurements performed at one or more moments in the lifecycle of the road R1. The method comprises deriving one or more best practices related to at least one of road construction and road maintenance considering, for the plurality of roads, the obtained datasets for the environmental data, the testing data, the inspection data, the maintenance data, the constructions data and the design data. The method also further comprises, during an intervention being performed on a road R2, altering in real-time one or more execution parameters of the intervention considering intervention data gathered in real-time during the intervention and the one or more best practices. The intervention is one of construction, maintenance or testing at the road R2 and the execution parameters include: a choice of material for the road R2; a construction technique for the road R2; a maintenance technique for the road R2 and/or a design choice for one or more structures of the road R2. Other embodiments of this aspect include corresponding computer systems, apparatus, and computer programs recorded on one or more computer storage devices, each configured to perform the actions of the methods. More specifically, in a further aspect, a non-transitory computer-readable medium is provided storing a set of instructions for improving one or more road quality indexes, the set of instructions allowing the method to be performed.

The described implementations may also include one or more of the following features. The datasets may be geo-referenced (e.g., georeferenced at the time of data gathering or georeferenced through analysis and/or post-treatment by an AI or expert system). The datasets may also be presented using a translation mechanism adapted to a receiver's construction trade. Altering may be performed to reduce one or more environmental impact related to the road R2. The altering may alternatively or additionally be performed for one or more of manufacturing activities, production activities or road works activities for the road R2. The best practices may be related to one or more of environmental impacts and regional guidelines.

Some implementations herein relate to a system comprising one or more processors configured to, for each road R1 from a plurality of roads, obtain two of more datasets having: design data related to a design phase of the road R1; construction data related to a construction phase of the road R1; maintenance data related to maintenance activities performed at one or more moments in a lifecycle of the road R1; inspection data related to inspections performed at one or more moments in the lifecycle of the road R1; test data related to tests performed regarding the road R1; and environmental data related to environmental measurements performed at one or more moments in the lifecycle of the road R1. The one or more processors are also configured to derive one or more best practices related to at least one of road construction and road maintenance considering, for the plurality of roads, the obtained datasets for the environmental data, the testing data, the inspection data, the maintenance data, the constructions data and the design data. The one or more processors are further configured to, during an intervention being performed on a road R2, alter in real-time one or more execution parameters of the intervention considering intervention data gathered in real-time during the intervention and the one or more best practices. The intervention is one of construction, maintenance or test at the road R2 and the execution parameters include: a choice of material for the road R2; a construction technique for the road R2; a maintenance technique for the road R2; a design choice for one or more structures of the road R2.

BRIEF DESCRIPTION OF THE DRAWINGS

Further features and exemplary advantages of the present invention will become apparent from the following detailed description, taken in conjunction with the appended drawings, in which.

DETAILED DESCRIPTION

Figure 1:
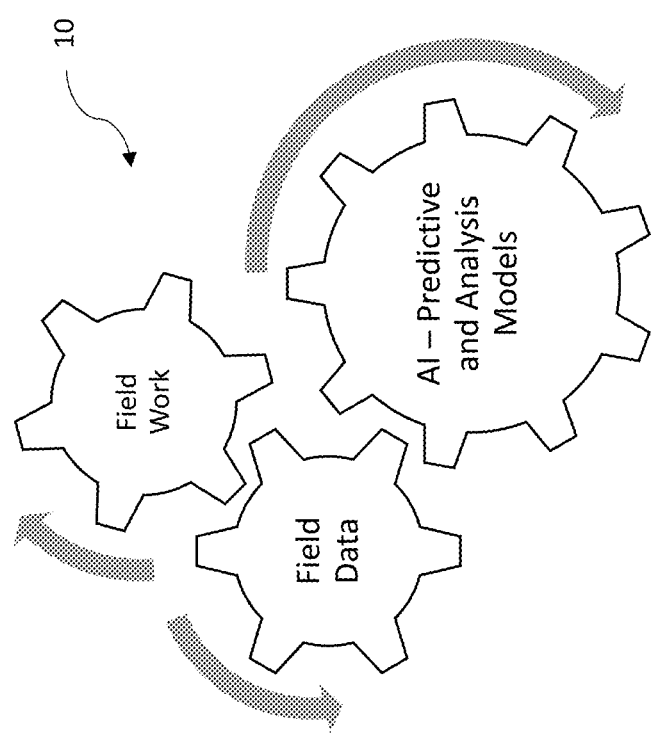
FIG. 1 is a conceptual block diagram of a system in accordance with the teachings of the present invention.

As previously stated, road design software solutions are generally developed according to a theoretical basis and uses specific field data corresponding to a measurement taken at one specific time and a single location that often tries to match the degraded condition of the road as design criteria.

Research performed in the context of the development of the solutions described herein helped to determine that a combination of one or many of history of maintenance, construction and actual state, and evolution of field conditions may be useful in the design phase of a road. Likewise, actual impact of natural climate change on infrastructure may also be helpful. In addition, there is no feedback provided from successes and drawbacks to the designers to help enhance road design according to local and regional data and the desired life span.

Furthermore, it has been noticed that a link between laboratory quality control software for materials and field quality control software would be helpful in at least some instances as it may allow, for instance, analyzing impact of the accurate material physical properties according to installation conditions on the road site. Measuring road condition during the design process, in addition to measurements carried out after any road work is done, may allow enhancement to the road design process. Likewise, increasing the frequency of follow-ups carried out may improve understanding evolution of the road's behavior and allow better planning of the maintenance interventions on a road structure installation.

Furthermore, increasing contacts, during road constructions, between the working crews and people involved in quality control may be helpful in preventing/correcting potential problems. Likewise, planning road maintenance on more than a theoretical basis, visual observations or user criticism may be useful in improving the results of the road maintenance.

In embodiments, there is provided a method for disseminating (e.g., simultaneously) technical information from several sources in a format applied to each profession of road construction in the form of a decision-making dashboard.

In embodiments, there is provided a method configured to aggregate data which is either not available or in silos in a single format making it possible to cover all the trades relating to design, study, monitoring, maintenance, repair and construction.

In embodiments, there is provided design software configured to use the technical history of a road for maintenance, reconstruction or to provide, depending on the technical data, the best local, regional and national construction or maintenance practices.

In embodiments, there is provided software offering the ability to share technical data under the same platform and in real-time with different stakeholders, e.g., to ensure the smooth running of road works.

In embodiments, there is provided a method of simultaneous and real-time optimization of manufacturing, production and site operations.

In embodiments, there is provided software linking environmental issues to technical issues by rating and suggesting best practices and best innovative techniques.

In embodiments, there is provided a rating method for each of the interventions, materials, techniques and methods and monitoring of a road, as well as an overall rating of a road based on technical data.

In embodiments, the system and method operate in three (3) specific technical layers covering the lifecycle of a road, e.g., from its conception to its end of useful life. The system may be embodied in an intelligent platform which may translate, to the various stakeholders and depending on the business lines, the quality of interventions, materials and works during the lifecycle of a road from its design to its end of useful life (e.g., out of nine (9) steps). Artificial Intelligence (AI) may therefore be used in certain implementations to obtain and/or improve translation mechanism(s) between different construction trades In embodiments, the system includes an intelligent and collaborative platform that uses technical data from different systems collecting test and measurement values in real time during field activities at different stages. Analyses are carried out simultaneously using predictive models, comparing the collected data with similar data and compiling the data, e.g., to allow the different types of working trades involved in this process to make better decisions and to use better practices to increase the work quality.

In embodiments, the system comprises multifactorial analysis and scoring models taking into account the quality and nature of raw materials, the quality of production, installation, auscultation, maintenance, climatic condition variation, and design techniques used to establish the road condition and its evolution. The applied analysis and scoring models also include an ecological index based on sustainable engineering models.

In embodiments, the system includes, among other things, models to predict the behavior of the road according to the types and nature of materials and the quality of these in addition to taking into account the quality of the work of installation, production, maintenance and road survey.

In embodiments, the system includes an assisted monitoring tool that enables decision-making based on defects or weaknesses in a road and best practices for maintaining, repairing or rebuilding it.

In embodiments, the method guides designers, builders and construction companies in the use of regional best practices to increase the longevity of road structure while reducing technical and financial risks.

In embodiments, the system and method comprise: management of the useful life of a road; monitoring and sharing of road construction and maintenance; tracking and sharing of material quality control data; real-time analysis of material performance data during construction; analysis of the impact of the production of materials and their choices on the quality of the road; predictive analysis of road behavior; analysis of regional best practices to transpose it to a road; analysis of the best materials and design data for a road; analysis of the sectors to be monitored during the monitoring of the useful life through auscultation and alerts for critical sectors; receiving field data from a remote site, laboratory and monitoring equipment; georeferencing all the data and combining the data into a whole constituting the technical DNA of the road in question.

In embodiments, the system comprises an intelligent platform that connects the technical information of a road from conception to end of useful life in order to improve its lifespan. The system includes road design and analysis tools to guide designers, owners and contractors to use better practices and better techniques, e.g., to ensure the sustainability of the road works by mitigating technical and financial risk using self-learning algorithms for construction or maintenance successes and failures, using artificial intelligence.

In embodiments, the system and method are configured to allow different types of workers to understand complex data by accessing such information depending on the skills and type of profession practiced by the worker. The translation of technical data through one or more translation mechanisms may be accessible to more than 30 types of road construction trades without necessarily needing cross-skills to understand the information and thus may increase the likelihood of success of the work while limiting the technical and financial risk for different stakeholders.

In embodiments, the system and method provide a green solution through its algorithms which promotes and accounts for the efforts, techniques, methods and materials that make it possible to reduce the environmental impact of works often considered to be polluting. A scoring algorithm allows for evaluating technical and ecological characteristics of the road.

In embodiments, the system and method follow the interventions and evolution carried out on a road and indicates the trends and rates of each road with quality indexes, e.g., allowing to follow the evolution of a road structure and use of the gathered data to improve design and construction of future roads.

Reference is now made concurrently to the Figures where there is shown a system 10 configured to collect, analyze and share real-time construction tasks performance data while suggesting techniques, methods and materials to enhance construction task performance based on data received by field applications and third-party applications. The system 10 also enables the communication and electronic exchange of data in real time supporting different stakeholders in decision making when situation sharing different characteristics reoccur.

Figure 2:
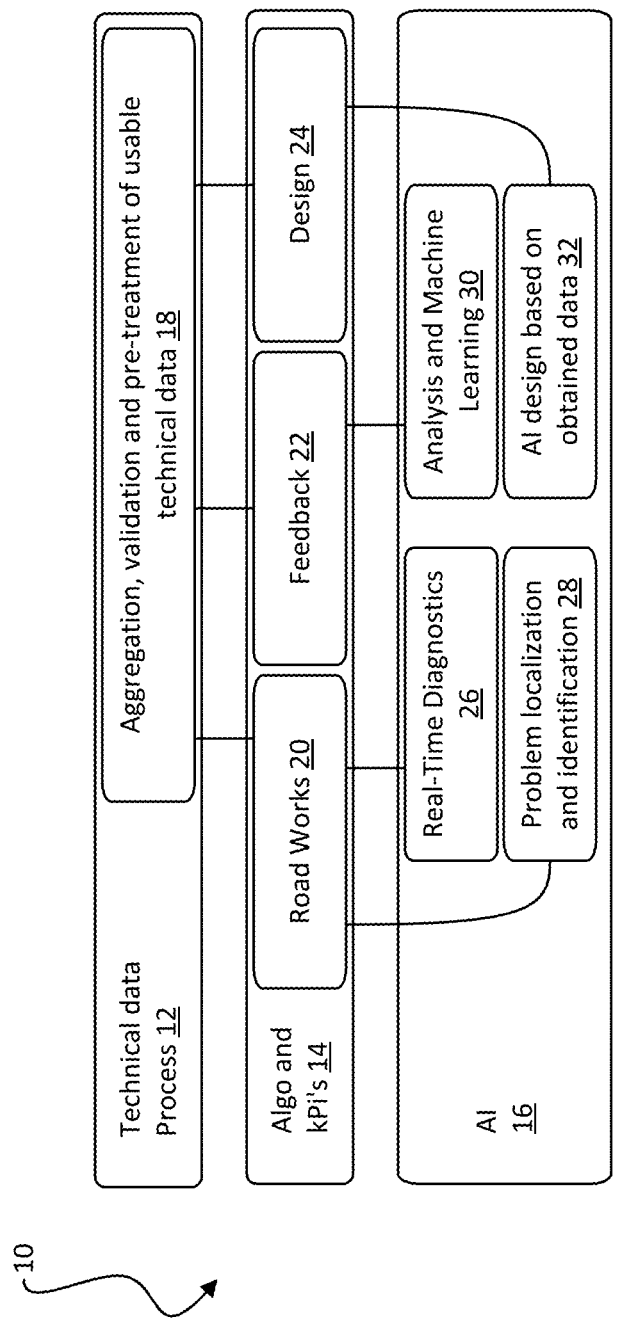
FIG. 2 is a block diagram of a system in accordance with the teachings of the present invention.

Referring to FIG. 2, the system 10 is built in three layers: a technical data process layer 12, and algorithm and key performance indicator (KPi) layer 14 (e.g., road quality indexes may be one form of KPi) and an artificial intelligence (AI) layer 16. The technical data process layer 12 includes a component 18 configured to perform the aggregation, validation and pre-treatment of technical data. The algorithm and key performance indicator (KPi) layer 14 includes three components: a road work component 20, a feedback component 22 and a design component 24. The artificial intelligence (AI) layer 16 comprises four components: a real-time diagnostic component 26, a problem localization and identification component 28, and analysis and machine learning component 30 and an AI design component 32.

Figure 6:
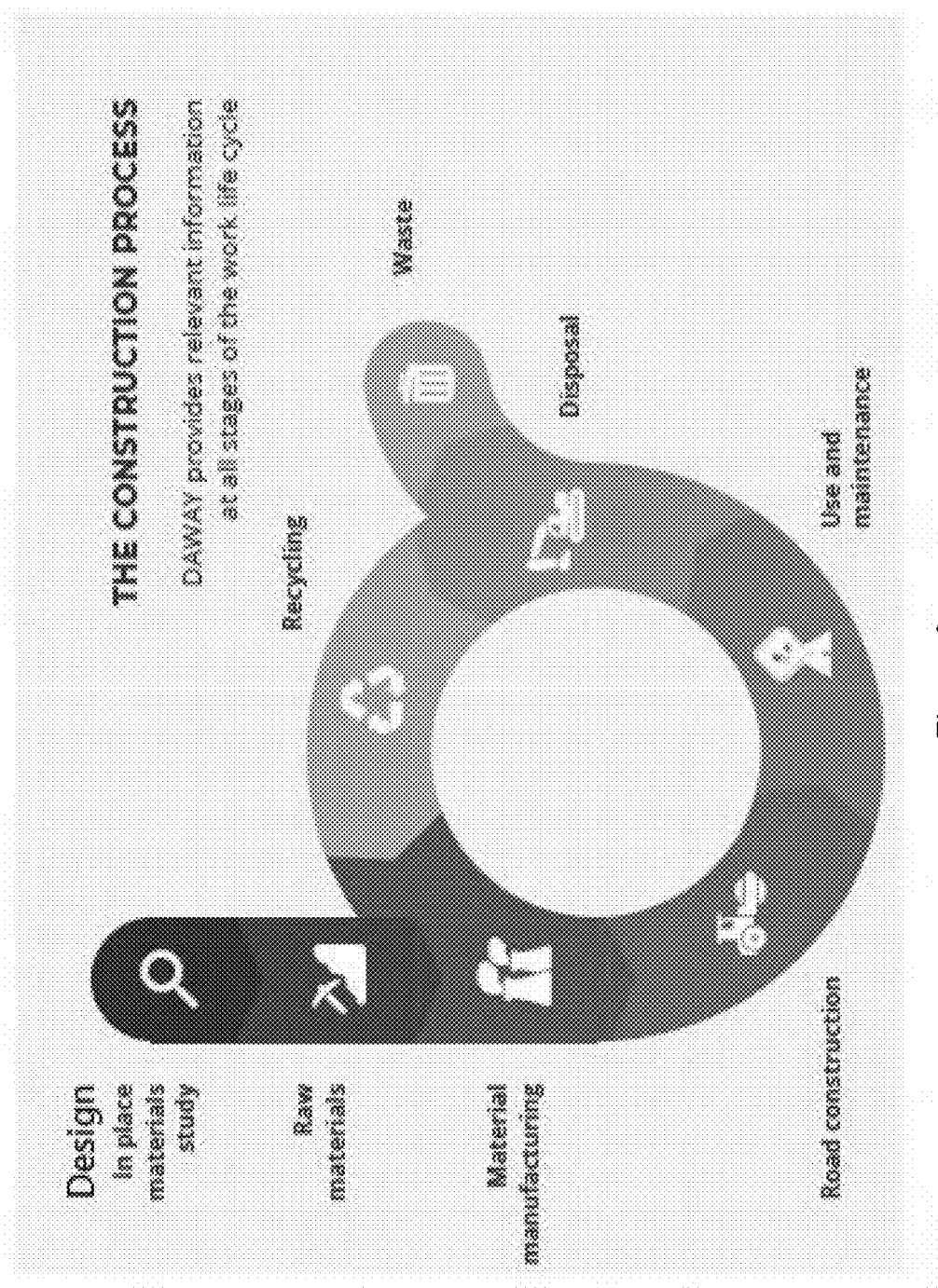
FIG. 6 is an integration diagram of the different stages of the road lifecycle loop that the system and method cover in accordance with the teachings of the present invention.

The real-time decision process network is returned to the user in the form of a Technical Management Dashboard, which receives information directly from algorithms and neural analysis processes (e.g., in each work's lifecycle steps as exemplified in FIG. 6)).

The system 10 includes algorithms for analyzing and predicting a rate of deterioration and repair techniques based on measurements, technical data from the works, the local and regional climate and similar behaviors observed on nearby works with sufficiently similar techniques, methods and materials. Thus, even during repairs or construction, the system 10 may analyze the potential lifespan of the work.

The system 10 may enable designing of a road according to the improved practices, materials and methods available locally or regionally, all according to climatic and environmental realities.

Figure 8:
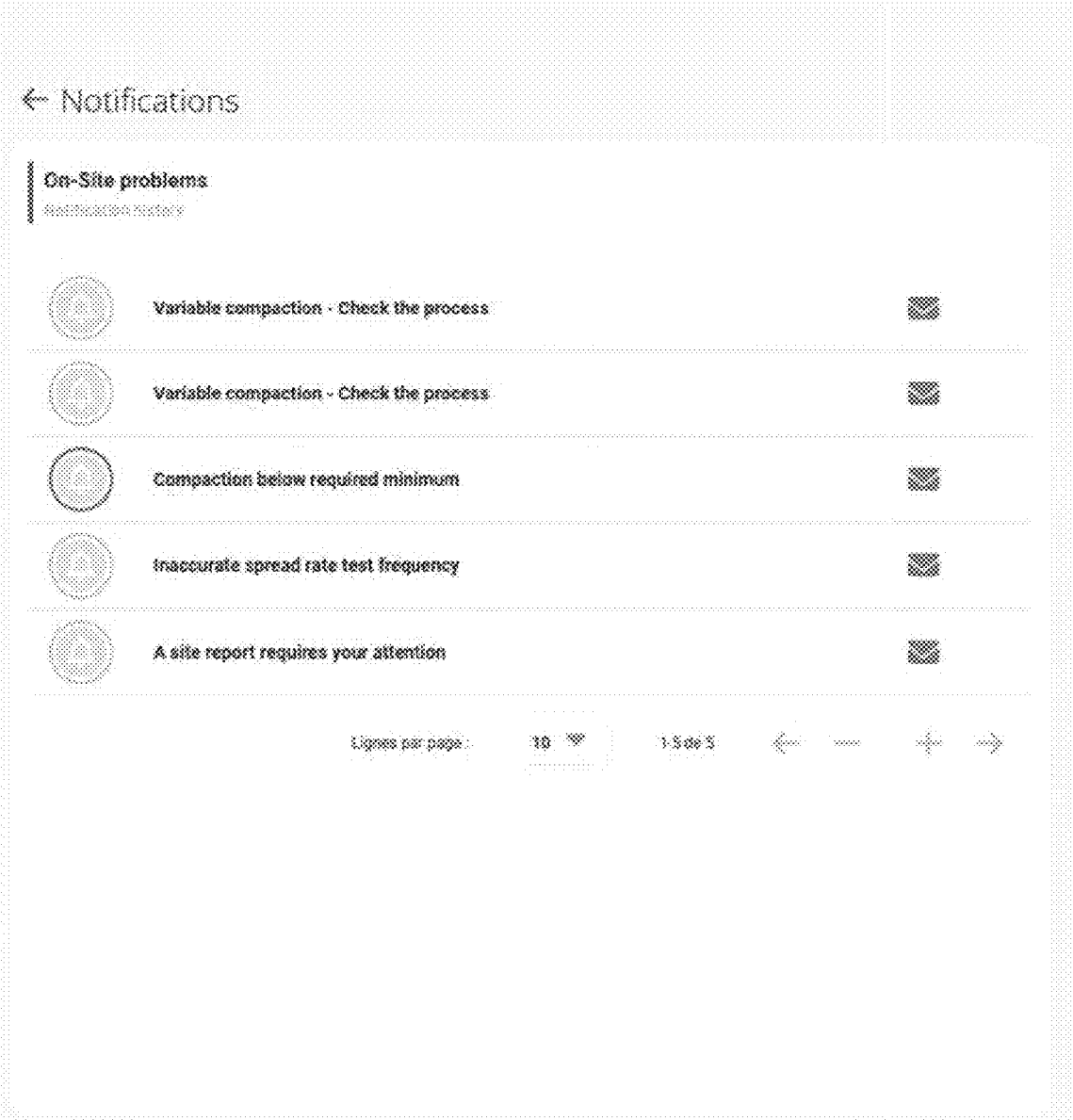
FIG. 8 represents the interaction and real-time diagnosis transmitted by notifications in accordance with the teachings of the present invention.
Figure 9:
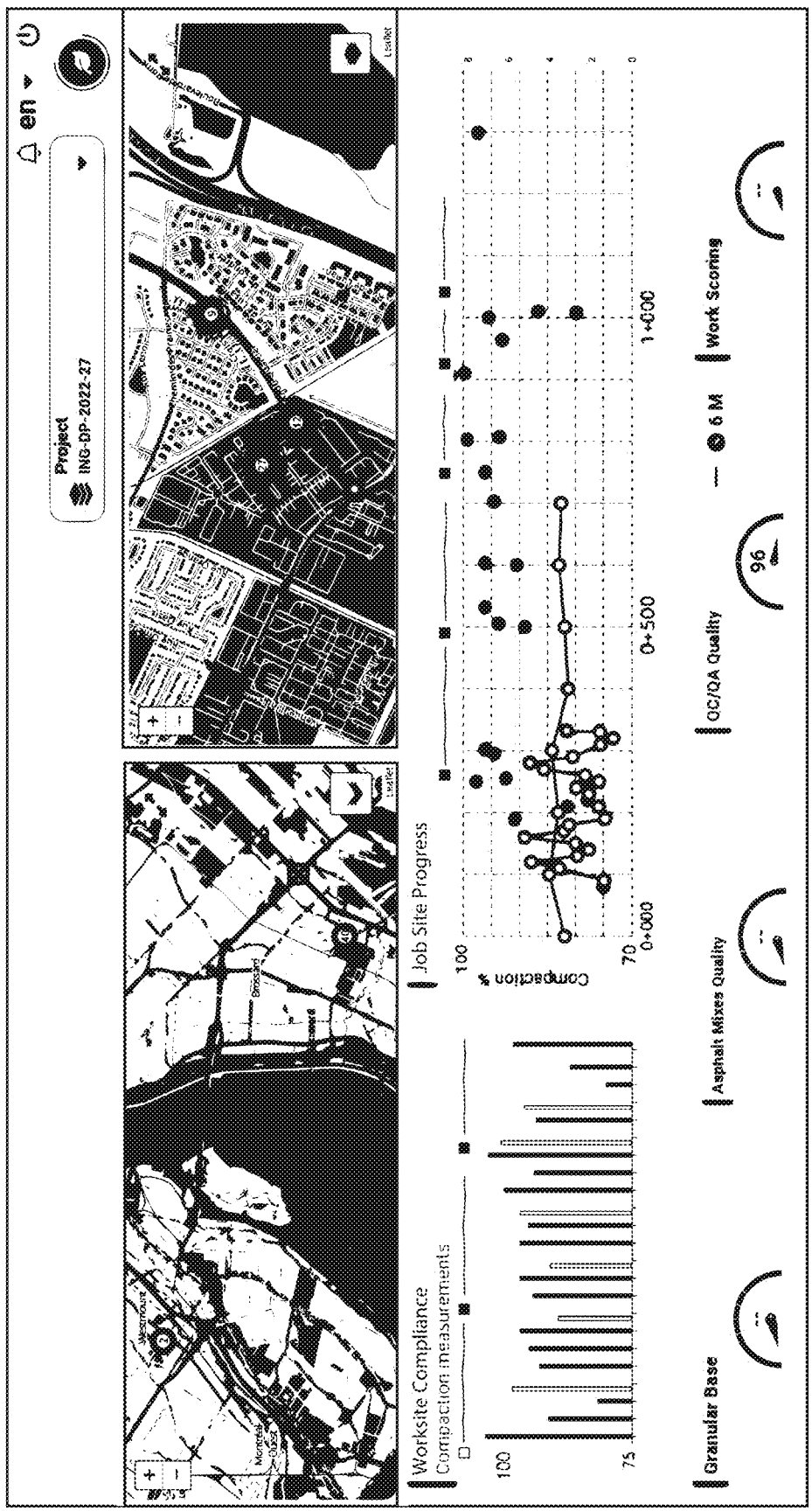
FIG. 9 represents the evolution analysis of the work's overall quality in accordance with the teachings of the present invention.
Figure 10:
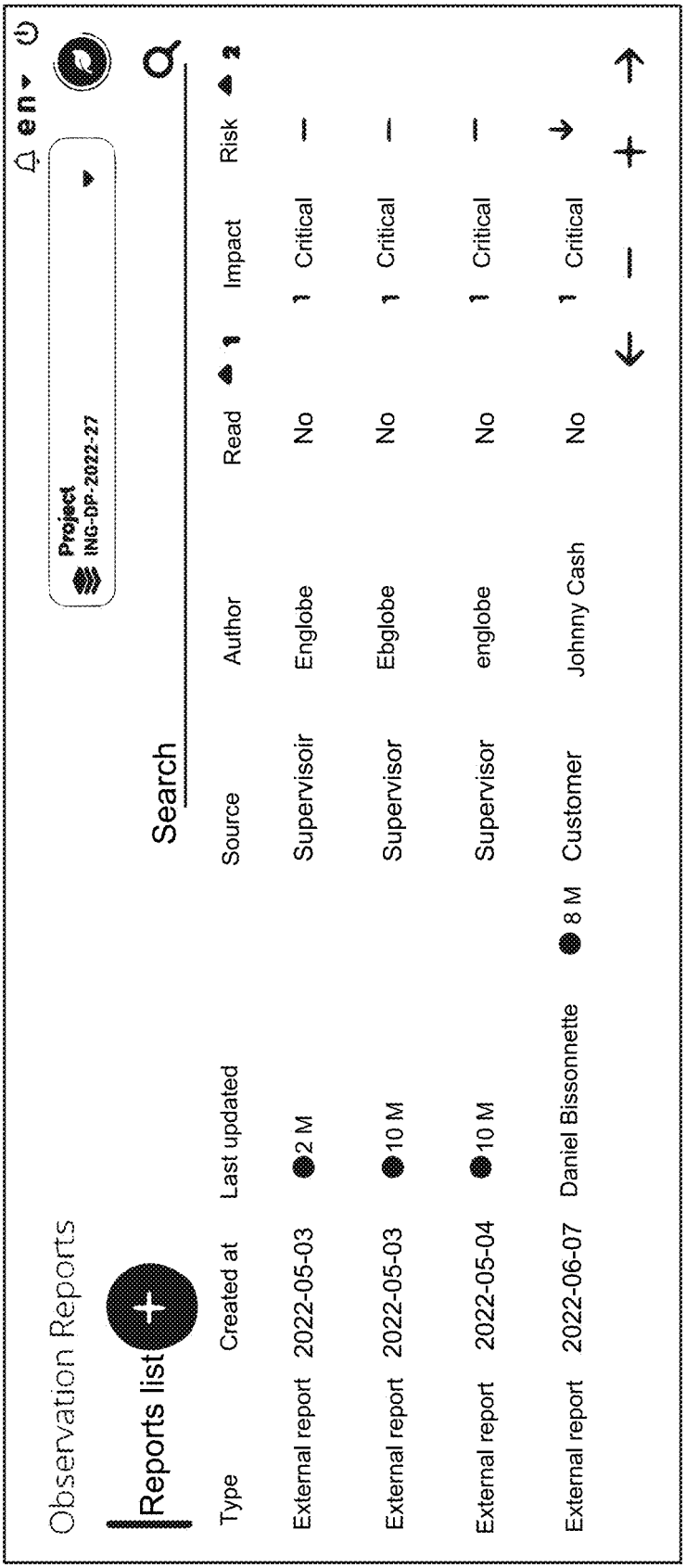
FIG. 10 is an example of real-time interaction to notify, document, treat and solve observed problems, in accordance with the teachings of the present invention.

The algorithms analyze the technical data provided and the historical data available for the design in order to make performance forecasts and suggestions for the best techniques and methods to ensure the expected life of the road structure. The algorithms may further analyze the technical data provided during the manufacturing of the materials and enhance them to improve performance and generate recommendations on the techniques and methods that promote quality of the works (see FIG. 11) by transmitting by way of notification (see FIG. 8) the best practices to the client. The algorithms may simultaneously produce update to the various stakeholders to enable the process in real-time (see FIG. 9) and bring corrective action if required quickly (see FIG. 10).

The real-time data analysis helps to provide data to elevate the skill level of staff involved in the process, guide stakeholders to best practices and catch faults while correctable. For example, during an on-site intervention, the client may access the best practices (see FIG. 7) and may be notified of the best practices (see FIG. 8), also informing in real time the clients who intervene on the project. The system 10, e.g., through its deep self-learning process, may further preserve historical data to ensure knowledge transfer to future generations of systems and/or workers. As such, during an intervention performed on a road, it is possible to alter, in real-time, one or more execution parameters of the intervention considering intervention data gathered in real-time during the intervention and one or more best practices. The intervention may be, for instance, construction, maintenance and/or testing being performed at the road. The execution parameters may include, for instance, one or more of a choice of material for the road, a construction technique for the road, a maintenance technique for the road and/or a design choice for one or more structures of the road. Altering the intervention may take the form of a notification as exemplified herein or other direct communication being sent to a production line and/or a work site for changes to be made in the intervention. The changes may be required to be performed at the time the notification is sent (e.g., adjust quantity of material being poured at a current location) or may be required at a later time (e.g., in a subsequent construction step) considering the gathered and analyzed data (e.g., adapt characteristics of the materials for a subsequent layer considering the gathered and analyzed data forth for the current construction step). Skilled persons will readily acknowledge that the altering may take different shapes or forms depending, for instance, on communication choices made by the different teams or team members involved and that the invention is not affected by such choices (e.g., communication over email, text messages, private chat channels, public social channels, . . . ). Furthermore, the altering may be performed over different channels than other communication (e.g., dedicated and/or prioritized).

Figure 13:
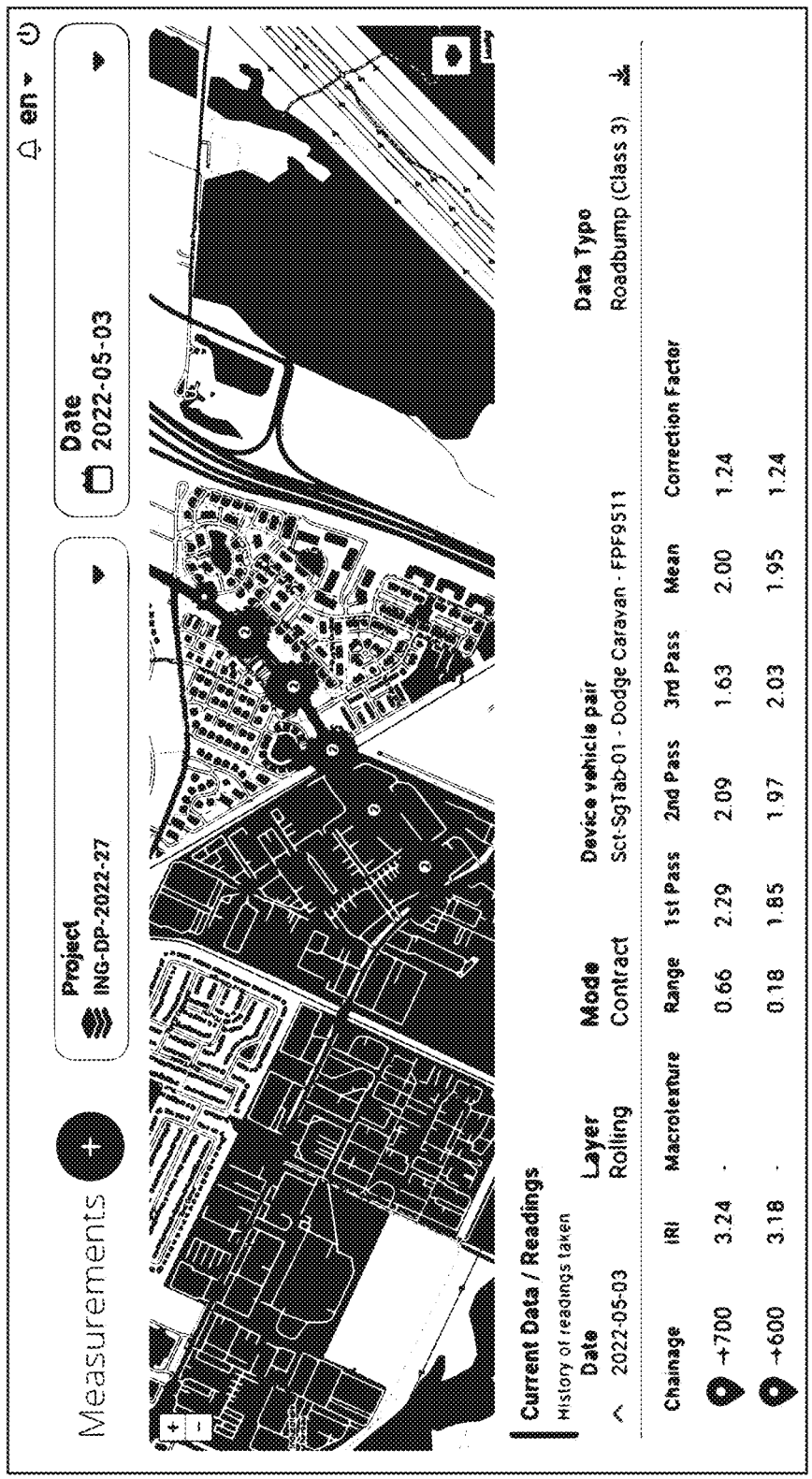
FIG. 13 is an example of the tool for analyzing and monitoring the road during its useful life in accordance with the teachings of the present invention.

For example, the system 10 may gather and analyze technical data in real time (e.g., every five minutes, every hour, every second . . . ), which would otherwise require several hours or even days for an average professional to gather. Furthermore, gathering in real time may be performed at one frequency (e.g., every five minutes) while the analysis may be performed at a different frequency (e.g., every hour). The system 10 may therefore continuously study data allowing professionals and stakeholders a better information process at different stages of the road lifecycle (see FIG. 6). The system 10 also allows different stakeholders to see the status of work in real time and according to their work trade (see FIG. 13).

The algorithms and kPi's structure 14, which can be adapted to different users, may use deep machine learning that make possible to associate, analyze and improve the techniques, materials and methods used by different types of stakeholders, according to their own operations, the environmental, climatic and regional realities. Artificial Intelligence (AI) may be used in certain implementations to obtain and/or improve translation mechanism(s) between different construction trades. The system 10 may reduce the technical and financial risk for a client, engineers and road construction contractors.

Figure 3:
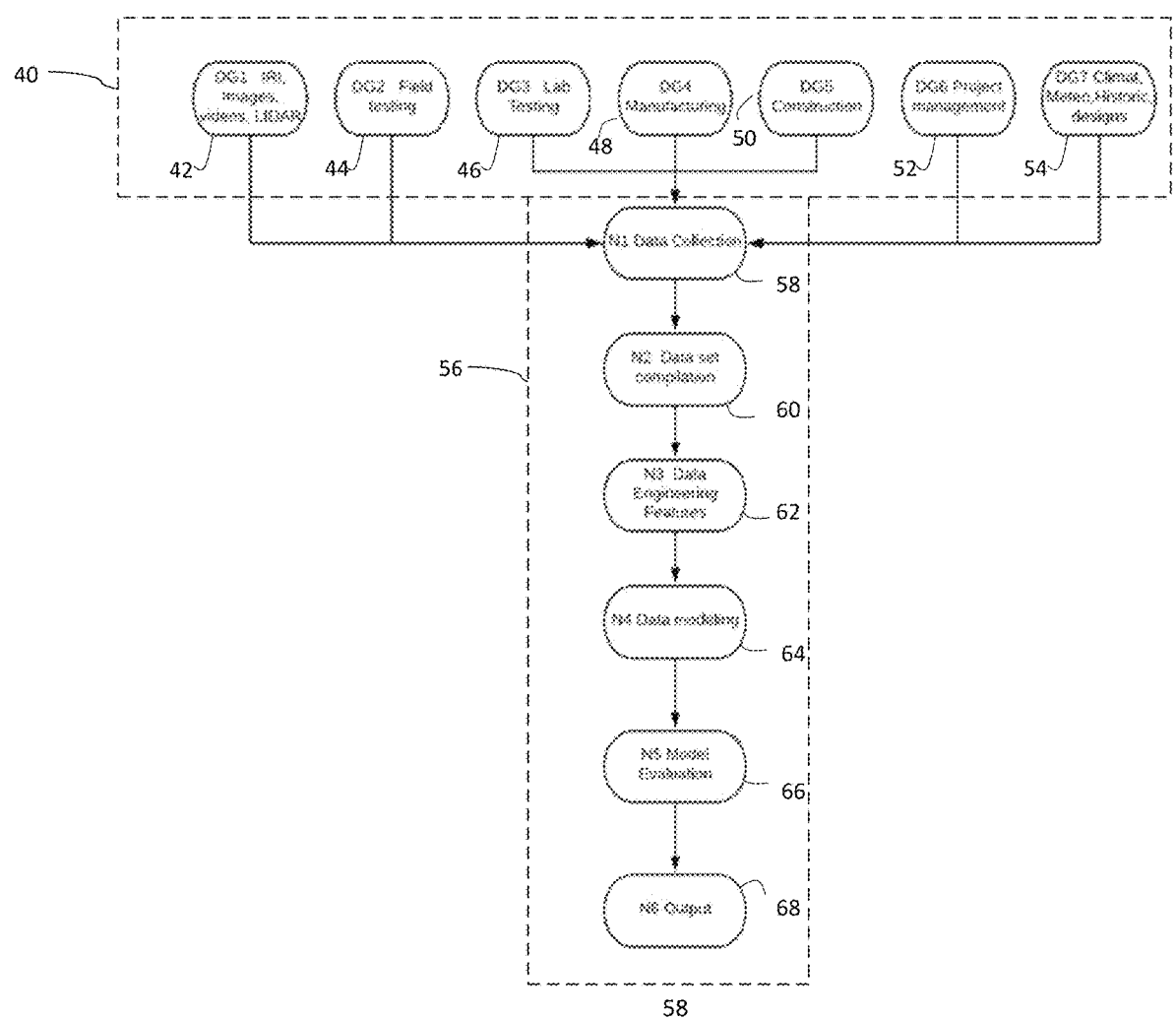
FIG. 3 is a flowchart of a method in accordance with the teachings of the present invention.

Referring now to FIG. 3, the system 10 is built on a data generation (DG) layer 40, which includes a plurality of software and applications, such as: DG1 (IRI measurement and acquisition system (ASTM Class 1, 2, 3) images, HD and 360° videos, LIDAR, Macrotexture, Rutting, LWD, FWD, CBR, LCMS) 42; DG2 field tests (Covering concrete, concrete products, asphalt layers, granular materials and soils for compaction, borings, drilling, sampling, thermography, adhesion, durability, environmental analysis) and receiving data from site equipment (Intelligent compactor, paving machine with 2D electronic correction system, leveling and placing system by automated control, dozers, flow meters) 44; DG3 laboratory tests (mechanical, physical and chemical tests on geotechnical soils, on granular materials, on concrete and concrete products and its components, on asphalt mixes and asphalt binders, on recycled, pulverized and stabilized materials, surface treatment) 46; DG4 manufacturing (ready-mix and precast concrete plant mixing and batching system, asphalt concrete mixing and batching system, crushing and production analysis system, scales) 48; DG5 construction (road, infrastructure, buildings, earthworks, bridges, viaducts, ports, airport) 50; DG6 project management (plans, specifications, requirements, progress of work, change order/modification, non-conformity, intermediate and final inspection, warranty) 52; DG7 (climate, weather, historical designs, available local materials).

The system 10 also includes node layer 56 that comprises a plurality of sub-nodes: a data collection sub-node N1 58; a data set compilation sub-node N2 60; a data engineering features node N3 62; a data modelling sub-node N5 64; a data model evaluation sub-node; N5 66; an output node N6 68 node.

Layer N5 56 includes a plurality of nodes involving sorting, ranking, machine learning, proprietary algorithms (or similar technology) and statistical processing of civil and sustainable engineering.

DG1 42 gathers and collects raw or preprocessed IRI data on the basis of pre-existing tools or tools on proprietary technology or similar technology. It includes IRI data of ASTM class 1, 2, 3 or similar type and IRI data collected from a mobile device application. DG1 42 may further gather and collect raw or preprocessed image data (e.g., georeferenced), lidar data, videos (e.g., georeferenced) on the basis of pre-existing tools or tools of proprietary technology or similar technology. DG1 42 may further gathers and collect raw or pre-processed macrotexture, rutting, LWD (Low Weight Deflectometer), FWD (Falling Weight Deflectometer), CBR (California Bearing Ratio), Dynamic/Cone Penetrometer, Geo plate test data based on pre-existing tools or proprietary or similar technology.

DG2 44 gathers and collects site test and measurement data georeferenced by proprietary (e.g., iPave-Field) technology or similar technology. DG2 44 may provide the system 10 with data on the compaction of soils and aggregates, tests on fresh concrete, results of compaction, thermography and conditions of asphalt mixes installations, cold in-place recycling, and pavement recycling. Sampling of soils, aggregates, concrete and bituminous materials may also be included in DG2 44.

DG3 46 gathers and collects test data in georeferenced laboratory algorithms using proprietary iPave and iCrete technologies or similar technologies. DG3 46 may provide the system 10 with data on the physico-chemical and physico-mechanical properties of materials. All raw and processed data related to the nature and quality of the materials in place or manufactured (such as bituminous materials, recycled materials, soil, aggregates, concrete, cements, chemical admixtures, and asphalt binders).

DG4 48 gathers and collects manufacturing data and monitors the materials used for road construction. The data may come from several sources, such as asphalt plant, concrete plant, crusher plant, weighing station, quality control systems, batching systems, mix designs.

DG5 50 gathers and collects construction data and methodologies used on site on a georeferenced basis. DG5 50 may provide the system 10 with data from total station, survey records, data from compactors, pavers, milling machine, imagery, construction equipment and site measurements.

DG6 52 gathers and collects data and actions/decisions taken by the various managers or project managers in connection with a road construction project.

DG7 54 gathers and collects the data of a road or one of its sections of the historical type of construction and maintenance, geotechnical, hydrogeological, climatic, weather forecast during interventions, date of events, expiry date of guarantees, loan by-law period, materials and techniques, frequency of maintenance.

All of the DG1 42 through DG7 54 terrain collection tools may be altered of changed without affecting the teachings provided herein. For instance, difference solutions may be provided for quality control, georeferenced image generation, lidar, intelligent compaction and/or various automation.

N1 58 constitutes the first node where the assembly and compilation of data from steps DG1 42 to DG7 54 element. N1 58 may comprise reconciliation algorithms and initial processing to identify and classify data for further processing.

N2 60 enables calibration, validation and data pre-processing in order, e.g., to create data sets and subset data for subsequent steps. In N2 60, proprietary algorithms or the likes may be used to, e.g., calibrate and validate the data entering the database. Data from the systems or applications is considered "internal" and data from third-party systems is considered "external". In some embodiments, data are processed from various sources according to a single evaluation scale, regardless of test and/or measurement method(s) used.

N3 62 constitutes the third node where the conservation of data (data curation) from various sources is organized, integrated and pre-processed. In N3 62, proprietary algorithms or the likes may be used to, e.g., describe and/or compute the parameters necessary to launch the selection criteria and data processing. In N3 62, data may be normalized and balanced before node N4 64 node.

N4 64 uses data from internal and/or external sources to feed machine learning algorithms. N4 64 deals with modelling of quantitative relationship structure, structure and terrain RQST which models the state of work or activities in progress with similar operations in this region or under field conditions and equivalent techniques and methods. N4 64 may include sub-nodes such as analysis of images, videos, lidar; Field data (Soils and Aggregates, base and sub-base materials such as bearing capacity, compaction, sampling and control of areas; Field data (Concrete: characteristics of fresh concrete, concrete load QC/QA and sampling); Field data (bituminous materials, pavement recycling: bearing capacity, compaction, sampling, thermography, Temperature, installation rate control and surface areas covered); Laboratory data (geotechnical type controls and measurements, soils, aggregates, bituminous mixes, bituminous binders, stabilized materials, recycled and synthetic materials, concrete, cement and chemical additives); Design (on a historical, local, regional basis, best practices, innovative practices, sustainable practices); Decision-making (monitoring changes and decisions made by project managers and/or foremen that have had an impact on the structure; Manufacturing/production optimization (optimization of material characteristics, detection of anomalies, suggestions for corrective methods, mix design and dosage of bituminous and concrete mixes, impact on work in progress); Optimization of working methods (choice of techniques, equipment, detection of technical anomalies according to equipment or methods used, best practices); Optimization of monitoring and maintenance (management of monitoring and maintenance according to the challenges of the field conditions, detection of premature distress, intervention plan according to the actual condition of the road, identification and monitoring of places with weaknesses during construction).

Figure 12:
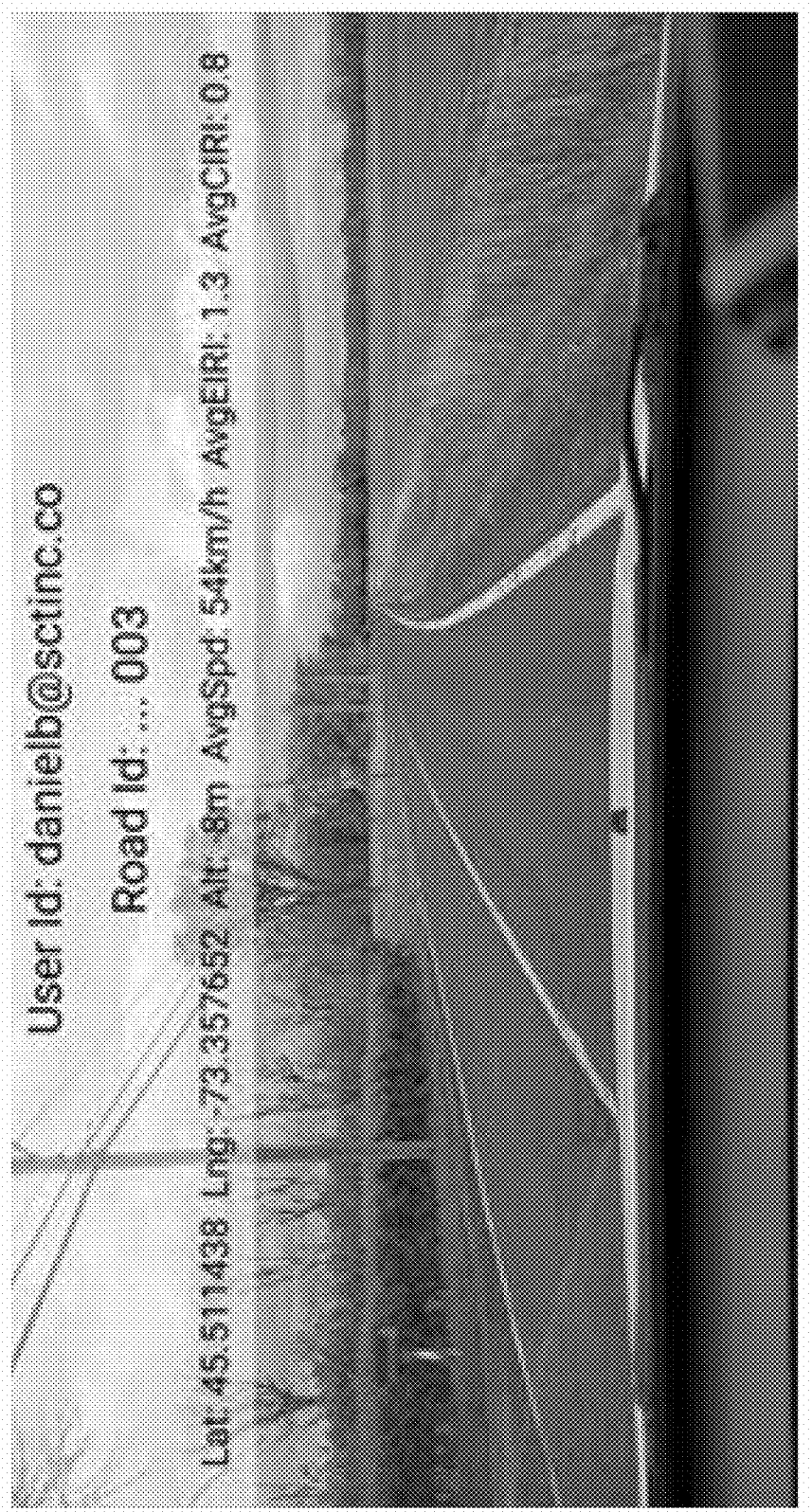
FIG. 12 is an example of the analytical, assisted, and comparative documentation using connected field or mobile tools to analyze the behavior of the structure in accordance with the teachings of the present invention

N5 66 contains interpretation and validation models to assess the technical risk and expected performance before, during and after the intervention. N5 66 uses predictive models, e.g., on both real-time and historical data. N5 66 may perform the benchmarking of the work according to the previous models and scores each item according to the quality and environmental algorithms calculated during the interventions. For instance, the system 10 may return data in real-time during various field interventions (see FIG. 7) and share the data with the stakeholders. The system 10 may then recalculate the performance indexes based on the findings, measurements, and data collected in the field. Performance indexes may be an element allowing classification of the roads according to different criteria such as quality index of the pre-project study; design quality index; quality index of the choice of materials for construction; quality index of the manufacturing processes of the materials used in construction; quality index of the materials installation process; quality index of quality control and quality assurance work; quality index of road monitoring and maintenance works; environmental indexes measured through the lifecycle of a road. For example, the indexes may allow to precisely know the state of the structure on a temporal basis and to follow the progress of the state according to the needs of intervention (see FIG. 13). The indexes may be computed from technical data and measurements but may also, alternatively or additionally, be computed from observations by imagery, lidar, video, LCMS or other techniques (see FIG. 12).

N5 66 may also make predictions based on the models such as level of technical and financial risks related to construction or repair operations (for example, the system 10 may update in real time the status of the works from a technical point of view and according to the real requirements observed during the works, study and maintenance operation (See FIG. 9)); evaluation of the lifecycle of the road; prediction and analysis of preventive maintenance cycles; monitoring of weak points on a road based on technical data (for instance, during construction, the construction may vary and have weak points that need to be monitored. And the system 10 may then mark and indicate to the client the areas that need to be monitored more carefully and automatically notes changes in the condition of the structure (see FIG. 13)); best practices for road repairs or construction; best sustainable engineering techniques for road repairs or construction; similar practices under identical conditions in terms of available materials, structure, weather, climate and standardization. For instance, when designing a road, the system 10 may offer both a theoretical design according to the AASHTO or other national standards and according to the local and regional performance history according to the targeted life expectancy (see FIG. 13). The system 10 may also propose techniques that have a positive environmental impact considering sustainable engineering principles. N5 66 may use the data set to suggest to the client a more appropriate methods to improve likelihood of success and intervention plans based on the historical data and the requirements of the structure.

N5 66 may also return diagnostics in real-time to the users of the technical management dashboard (TDM) to support reaction from one or more of the sectors: IRI (International Roughness Index) (for instance, with the help of available measuring tools, it may become possible to establish the evolution of the IRI at any period of the year and on the same basis of classification regardless of the ASTM category of the tool used (see FIG. 9)); Analysis of images, videos, lidar; Field data (Geotechnics, Soils and Aggregates); Field data (Concrete); Field data (bituminous materials, pavement recycling); Laboratory data (control tests and measurements) (for instance, clients associated with the same project can receive field data formatted according to their role and understanding needs to make timely decisions (see FIG. 13)); Design assisted on a theoretical basis and best regional practice; Decision on the basis of the updated evolution of the work and the technical data, measurements and findings over time; Manufacturing/production optimization; (for instance, during the production of an asphalt mix, the system 10 may calculate and cross-reference raw material data with the results of field and laboratory measurements to recommend, advise and alert the client if it is necessary to adjust the production process in real-time and the system 10 may establish within 5 minutes a diagnosis of the production, search for optimization possibilities, and allows to simulate adjustments according to the history and the quality of the materials and asphalt binders (see FIG. 11)); Optimization of working methods for instance, when the quality index indicates an operational problem or when staff do not achieve the desired objectives, the system triggers notifications of training requirements for the clients affected by the problem; Optimization of surveys and maintenances (for instance, the system 10 may maintain the calculation of the performance indexes of the structure and indicate, at each stage, the interventions and the places where it is necessary to intervene according to a work plan allowing to ensure targeted interventions with the appropriate techniques (see FIG. 13)).

N6 68 provides a Technical Management Dashboard (TMD) type interface allowing the different businesses or trades to fully understand the information processed. These TMDs translate multiple and complex technical information into relevant and simple information in real time during interventions. N6 68 may allow the interveners to modify parameters of the task being performed on the spot, e.g., in order to avoid defects or future problems. TMDs are made up of predefined KPi's that may be customized according to the skill level or needs of the user. TMDs cover the following professions without being limited to these: General manager (entrepreneur or client); Project manager (Entrepreneur, clients, Consultant engineer, site inspectors); Construction foreman; Production foreman; Site technician (installation, control, quality assurance); Laboratory technician (production, manufacturing, quality control, quality assurance); Auscultation technician (IRI, imaging, Lidar, videos, automated measurements); Technical Manager; Designer; Responsible for maintenance and monitoring.

Figure 4:
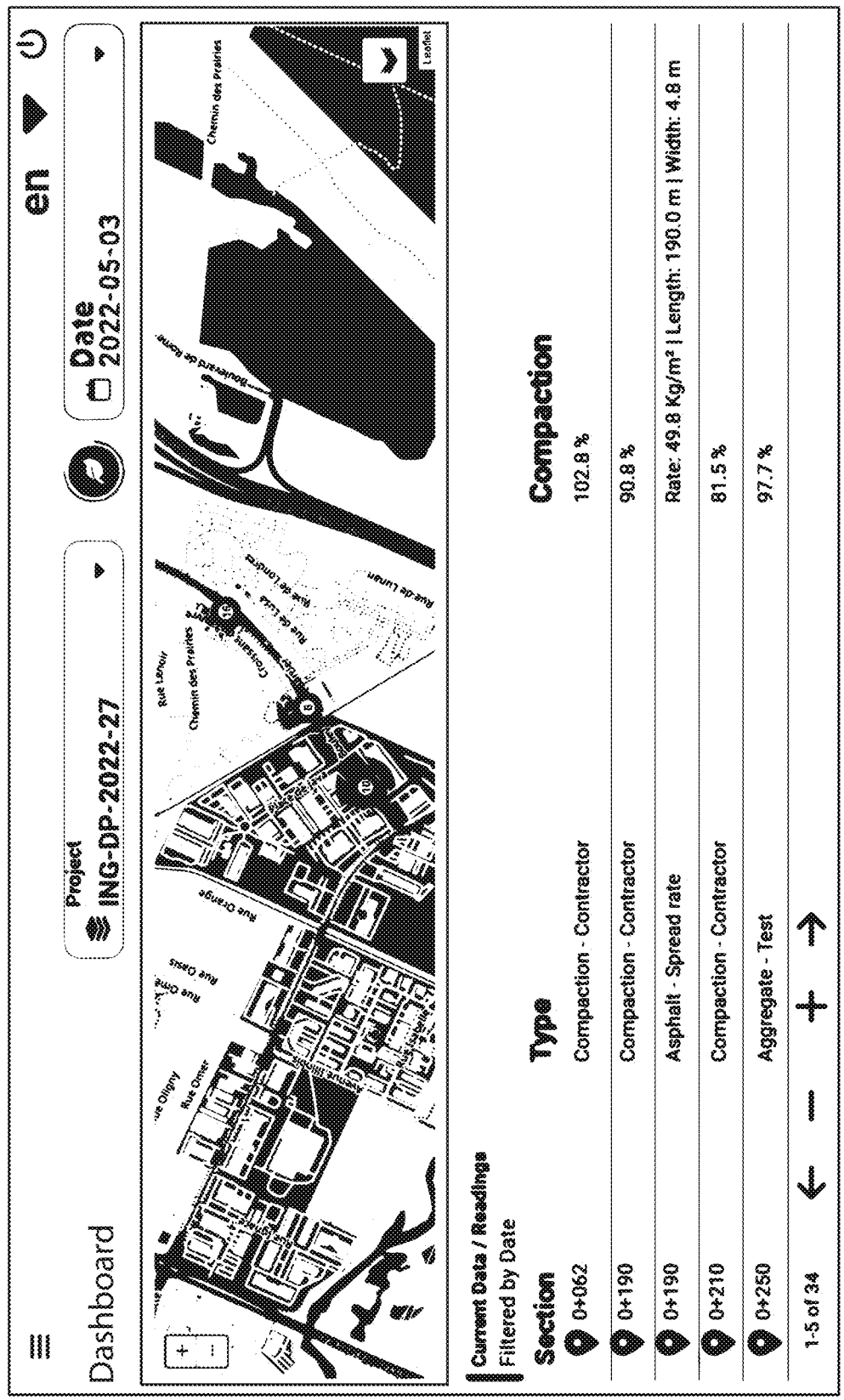
FIG. 4 is an example of a technical management dashboard in accordance with the teachings of the present invention.

Different TMDs may receive real-time information following work site interventions at the same time in a format ensuring needs and urgency of decision-making are respected. The format may be a combination of graphic, table and textual (notifications). An example of a TMD 4000 is illustrated in FIG. 4.

Nodes N2 58 to N6 68 represent a system 10 according to a preferred embodiment of the invention. With the exemplary system 10, a worker may be able to associate, in real time and on a technical basis, manufacturing, inspection and test data with field data and to attach the data to a performance during the work. With the system 10, it may become possible for designers to associate past, present and future performance with actual field data at the time of the work. With the system 10, designing a structure taking into account real climatic changes and changes in conditions observed in the field may be made possible.

The system 10 may use artificial intelligence and deep learning to enable the retention of a network's expertise within the client's team while ensuring to use prior learning to guide users in decision-making with best practices and knowledge from the industry and the region. The system 10 may further take into account the history and real situations in the field, resulting in enhanced tasks and improved (e.g., more uniform) results that have higher likelihood of meeting contractual objectives and requirements. As such, one or more best practices related to at least one of road construction and road maintenance may be derived (e.g., obtained or improved using one or more AI models and/or expert systems) considering, for multiple roads, the environmental data, the testing data, the inspection data, the maintenance data, the constructions data and/or the design data.

Figure 5:
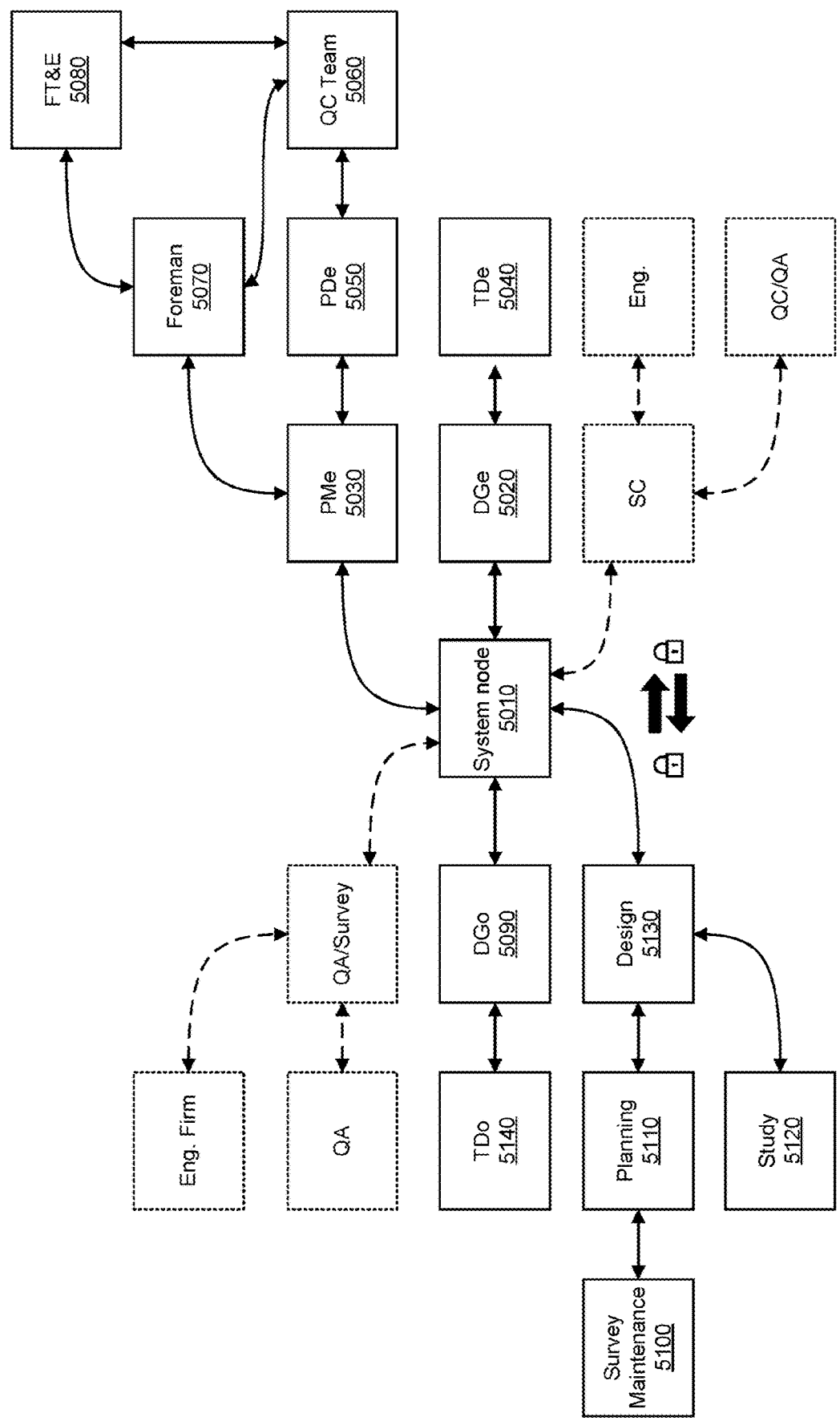
FIG. 5 is an example block diagram of the interaction mode between role groups within the same organization in accordance with the teachings of the present invention.

In FIG. 5, a system node 5010 is depicted attached to one or more organizations that may hold several roles, depicted as tiles on FIG. 5, using the following acronyms:

Eng. Firm: Stakeholder—Engineering Firm; QA: Stakeholder—Quality Assurance Firm; QA/Survey: Stakeholder—Quality assurance and/or Surveyor Project Manager; TDo: Stakeholder Technical Team; DGo: Road Owner Manager; Survey Maintenance: Road Owner Maintenance and/or Survey Team; Planning: Road Owner Engineering; Study: Stakeholder expertise and/or geotechnical firm; Design: Stakeholder Design and/or project management; PMe: Entrepreneur Project Manager; DGe: Entrepreneur Manager; SC: Entrepreneur Sub Contractor; Foreman: Entrepreneur Foreman and/or superintendent; PDe: Entrepreneur Production Manager; TDe: Entrepreneur Technical Manager; Eng.: Entrepreneur Sub Contractor Engineering; QC/QA: Entrepreneur Sub Contractor Quality control and/or Quality Assurance; FT&E: Entrepreneur Field Team and Equipment; and QC Team: Entrepreneur Quality Control Team.

In the example of a construction project, contractor and client parties would be represented on the right side. Co-contractors may share all or part of the information comprising results, measurements, and data that the different roles collect during the work, as described in FIG. 3. One exemplary problem in existing projects is that a large amount of data is collected during the various works life-cycles, and project owner may need to use that permanently. The digital form accessible for technical analysis of the gathered information may be referred to, metaphorically, the DNA of a road as well as being described as a digital experience transferable to one or more individuals.

These data constitute the data history of a project that, in their roles, the different clients gather and collect raw or pre-processed data based on pre-existing tools or tools on a proprietary technology or a similar technology. The system node 5010 continuously receives and returns the necessary information to the roles according to the processes explained in FIGS. 2 and 3.

Figure 7:
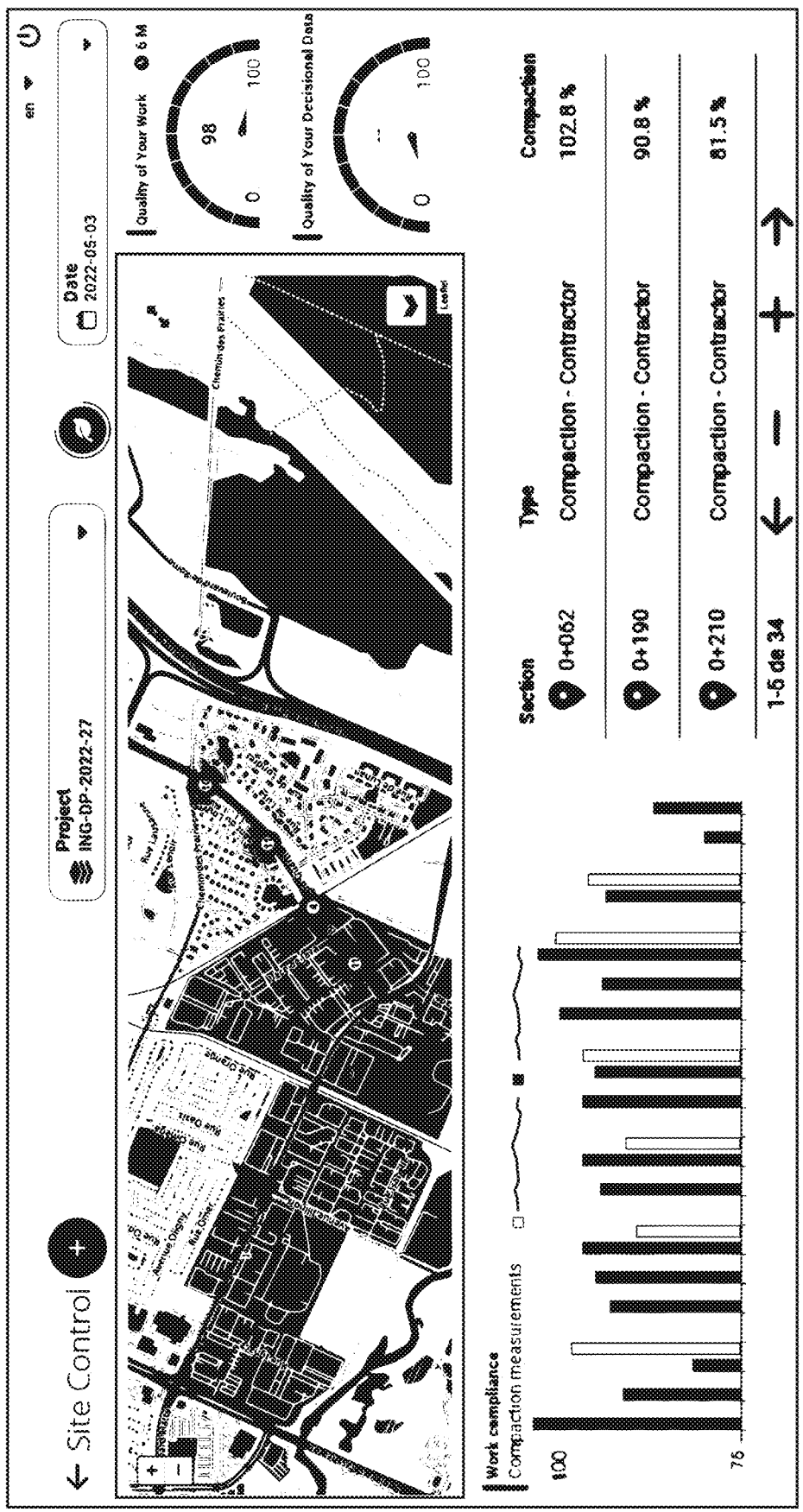
FIG. 7 is an example of a technical management dashboard representing the results during fieldwork in accordance with the teachings of the present invention.
Figure 11:
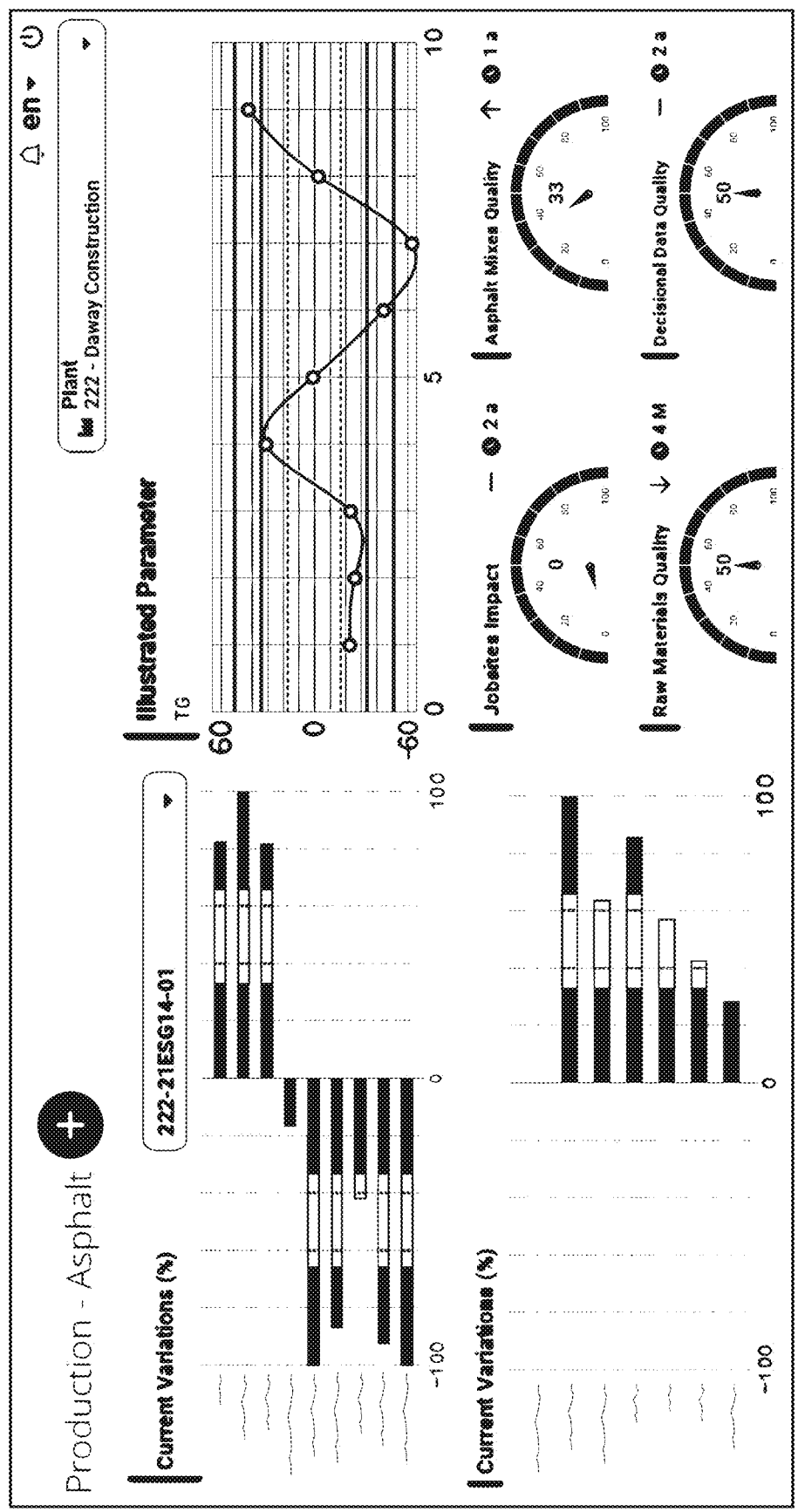
FIG. 11 is an example of the real-time analysis of manufactured, sampled, or delivered materials and the optimization process in accordance with the teachings of the present invention.

There can be one or more organizations linked to the system node 5010 during the work. While considering external rules (such as confidentiality agreements, privacy rights, . . . ), the DGe 5020 and the DGo 5090 have a complete view on the project activities. For example, consider the right side of FIG. 5. Each step planned by the PMe 5030 is transmitted through step 52 in FIG. 3, received by the system and processed (Nodes N1 58 to N3 62 in FIG. 3), analyzed (Nodes N4 64 and N5 66 in FIG. 3), and shared (Node N6 68 in FIG. 3) to the PDe 5050 and Foreman 5070 run. Each intervention executed by FT&E 5080 and QC Team 5060 is received by steps 42, 44, 46, 48, and 50 in FIG. 3 by the system node 5010. The information is then processed (Nodes N1 58 to N3 62 in FIG. 3), analyzed (Nodes N4 64 and N5 66 in FIG. 3), and shared in different forms across the clients involved in the project (Node N6 68 in FIG. 3). For example, FIG. 11 represents the feedback from QC Team 5060 data and metrics analysis that are shared and analyzed by the system node 5010 to improve likelihood of project success and PDe 5050 and PMe 5030 requirements. FIG. 7 represents the feedback from the analysis of FT&E 5080 data and metrics that are shared and analyzed by the system node 5010 to improve likelihood of project success and the requirements of Foreman 5070 and PMe 5030. The TDe 5040 receives a continuous analysis of different activities of the organization to enhance operations, while the DGe 5020 receives a continuous analysis of the technical and financial risks of the operations executed by different teams.

During monitoring and maintenance, there can be one or more organizations linked to the system node 5010. Depending on the sharing authorizations, the DGo 5090 may have complete view of the project activities. The TDo 5140 receives the continuous analysis (FIG. 9) of the activities of the organization to enhance the monitoring and maintenance operations, thus allowing to follow the action plan of the planning team 5110. The monitoring and maintenance teams 5100 may therefore transmit information to the system node 5010 according to steps 42, 44 and 54 of FIG. 3. The information is received by the system node 5010 and processed (Nodes N1 58 to N3 62 in FIG. 3), analyzed (Nodes N4 64 and N5 68 in FIG. 3) and shared in different forms according to their role (Node N6 68 in FIG. 3) to 5100 and 5110 for the realization of their activities and allows 5090 and 5140 to monitor, for example, the needs of the network in real time in various formats, including FIGS. 12 and 13.

There can be one or more organizations linked to the system node 5010 during the 5130 design. Depending on the sharing authorizations, the DGo 5090 may have a complete view of the project activities. Depending on the customer's internal process, there may be a study stage 5120 before the design 5130. The study 5120 may transmit information to the system node 5010 according to steps 42, 44, 46 and 54 in FIG. 3, which is received by the system node 5010 and processed (Nodes N1 58 to N3 62 in FIG. 3), analyzed (Nodes N4 64 and N5 66 in FIG. 3) and shared to 5130 (Node N6 68 in FIG. 3). During the design 5130 activity, the system node 5010 may retrieve the analysis and data from the information set for the point geolocated on the map and nearby. The designer 5130 may then receive the current state of the structure at the level of the different layers, the quality of the current materials according to the quality of the materials at the time of the various works, the cycles and maintenance work carried out, the deteriorated places, the probable or verified causes, the real state of the use of the structure (history of the traffic, loads, frequency, climatic and meteorological conditions). Finally, the designer 5130 may receive from the system node 5010, the analysis of potential options according to the structure's condition for repair or reconstruction.

The designer 5130 can also ask the system node 5010 about the most successful local and regional techniques for the same type of structure. The system node 5010 may take into account the most recent techniques and local materials available. Different treatments and suggestions may be associated with a "green" index to inform the designer 5130 of potential ecological impact and available sustainable engineering practices. Depending on the designer's 5130 requirements, the system node 5010 may return various design scenarios, with engineering data calculated according to the AASHTO standard or similar, but also according to the real state of the integral degradation process measured during the various interventions in addition to the real data of use and climate. Each of the requests may activate the Nodes N1 58 to N3 62 (in FIG. 3) during processing, analyze the requests (Nodes N4 64 and N5 66 in FIG. 3) and shares to 5130 from Node N6 68 (in FIG. 3) the results.

Figure 14:
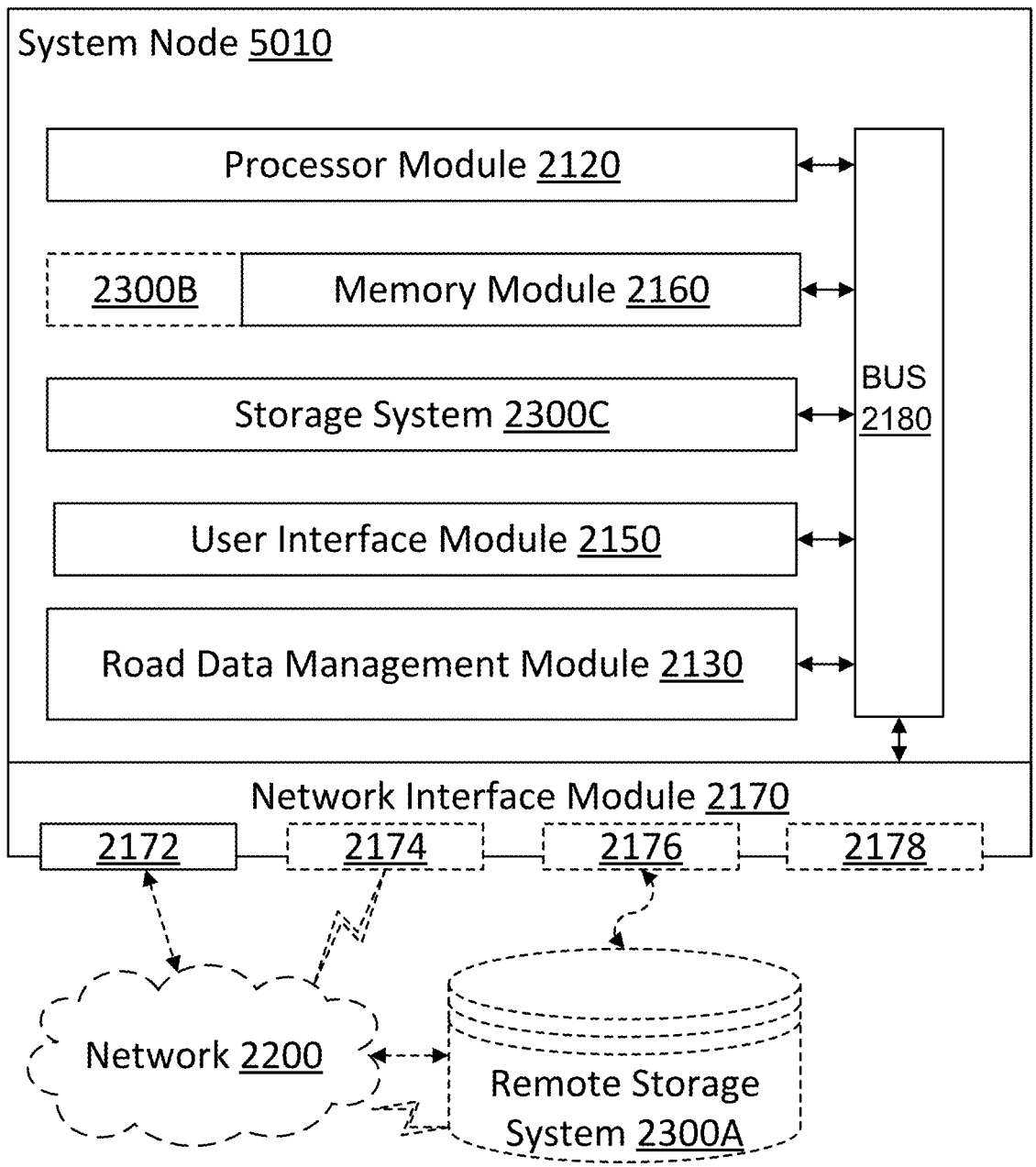
FIG. 14 is a logical modular representation of an exemplary system node in a network deployed in accordance with the teachings of the present invention.

Reference is now made to the drawings in which FIG. 14 shows a logical modular representation of an exemplary system 10 comprising a system node 5010 in a network 2200. The system node 5010 comprises a memory module 2160, a processor module 2120, a road data management module 2130 and a network interface module 2170. The system node 5010 may also include a user interface module 2150.

The system 10 may comprise storage for storing and accessing long-term (i.e., non-transitory) data and may further log data while the system node 5010 is being used. FIG. 14 shows examples of storage as a remote storage system 2300A, a storage system 2300C of the system node 5010 or a sub-module 2300B of the memory module 2160 of the system node 5010. The storage may be distributed over different systems 2300A, 2300B, 2300C. The storage may comprise one or more logical or physical as well as local or remote hard disk drive (HDD) (or an array thereof). The storage may further comprise a local or remote database made accessible to the system node 5010 by a standardized or proprietary interface or via the network interface module 2170.

The network interface module 2170 represents at least one physical interface that can be used to communicate with other system nodes. The network interface module 2170 may be made visible to the other modules of the system node 5010 through one or more logical interfaces. The actual stacks of protocols used by the physical network interface(s) and/or logical network interface(s) 2172-2178 of the network interface module 2170 do not affect the teachings of the present invention.

The processor module 2120 may represent a single processor with one or more processor cores or an array of processors, each comprising one or more processor cores. The memory module 2160 may comprise various types of memory (different standardized or kinds of Random Access Memory (RAM) modules, memory cards, Read-Only Memory (ROM) modules, programmable ROM, etc.).

A bus 2180 is depicted as an example of means for exchanging data between the different modules of the system node 5010. The teachings presented herein are not affected by the way the different modules exchange information. For instance, the memory module 2160 and the processor module 2120 could be connected by a parallel bus, but could also be connected by a serial connection or involve an intermediate module (not shown) without affecting the teachings of the present invention.

The road data management module 2130 provides road data management-related services to the system node 5010, which will be described in more details hereinbelow.

The variants of processor module 2120, memory module 2160 and network interface module 2170 usable in the context of the present invention will be readily apparent to persons skilled in the art. Likewise, even though explicit mentions of the road data management module 2130, the memory module 2160, the user interface module 2150 and/or the processor module 2120 are not made throughout the description of the present examples, persons skilled in the art will readily recognize when such modules are used in conjunction with other modules of the system node 5010 to perform routine as well as innovative elements presented herein. In some implementations, the system node 5010 may be replicated, duplicated, or otherwise copied, and different ones of the modules thereof may be implemented in physical environment, in a virtual environment or a mix therebetween. One or more additional intermediate modules (not shown) may be added without affecting the teaching of the present invention. Likewise, the road data management module 2130 may also alternatively or additionally be segregated, duplicated or both, e.g., to conform with different environment specifications.

Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on the link between. Likewise, any number of routers (not shown) may be present and part of the link, which may further pass through the Internet.

The present invention is not affected by the way the different modules exchange information between them. For instance, the memory module and the processor module could be connected by a parallel bus, but could also be connected by a serial connection or involve an intermediate module (not shown) without affecting the teachings of the present invention.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

The invention claimed is:

1. A method for improving one or more road quality indexes comprising:
   for each road R1 from a plurality of roads, obtaining two or more datasets comprising:
      design data related to a design phase of the road R1;
      construction data related to a construction phase of the road R1;
      maintenance data related to maintenance activities performed at one or more moments in a lifecycle of the road R1;
      inspection data related to inspections performed at one or more moments in the lifecycle of the road R1;
      testing data related to tests performed regarding the road R1; and
      environmental data related to environmental measurements performed at one or more moments in the lifecycle of the road R1; and
   deriving one or more best practices related to at least one of road construction and road maintenance considering, for the plurality of roads, the obtained datasets for the environmental data, the testing data, the inspection data, the maintenance data, the construction data and the design data;
   during an intervention being performed on a road R2:
      gathering intervention data during field activities;
      computing a suggestion from the intervention data using a predictive model and the best practices; and
      altering one or more execution parameters of the intervention based on the suggestion;
   wherein the gathering, the computing and the altering is performed in real-time;
   wherein the intervention is one of construction, maintenance or testing at the road R2; and
   wherein the execution parameters include at least one of:
      a choice of material for the road R2;
      a construction technique for the road R2;
      a maintenance technique for the road R2; and
      a design choice for one or more structures of the road R2.

2. The method of claim 1, wherein one or more of the datasets are georeferenced.

3. The method of claim 1, wherein the datasets are presented using a translation mechanism adapted to a receiver's construction trade.

4. The method of claim 1, wherein the altering is performed to reduce one or more environmental impacts related to the road R2.

5. The method of claim 1, wherein the altering is performed for one or more of manufacturing activities, production activities or road works activities for the road R2.

6. The method of claim 1, wherein the best practices are related to one or more of environmental impacts and regional guidelines.

7. A system for improving one or more road quality indexes comprising one or more processors configured to:
   for each road R1 from a plurality of roads, obtain two or more datasets comprising:
      design data related to a design phase of the road R1;
      construction data related to a construction phase of the road R1;
      maintenance data related to maintenance activities performed at one or more moments in a lifecycle of the road R1;
      inspection data related to inspections performed at one or more moments in the lifecycle of the road R1;
      testing data related to tests performed regarding the road R1; and
      environmental data related to environmental measurements performed at one or more moments in the lifecycle of the road R1; and
   derive one or more best practices related to at least one of road construction and road maintenance considering, for the plurality of roads, the obtained datasets for the environmental data, the testing data, the inspection data, the maintenance data, the construction data and the design data;
   during an intervention being performed on a road R2:
      gather intervention data during field activities;
      compute a suggestion from the intervention data using a predictive model and the best practices; and
      alter one or more execution parameters of the intervention based on the suggestion;
   wherein the gathering, the computing and the altering is performed in real-time;
   wherein the intervention is one of construction, maintenance or testing at the road R2; and
   wherein the execution parameters include at least one of:
   a choice of material for the road R2;
   a construction technique for the road R2;
   a maintenance technique for the road R2; and
   a design choice for one or more structures of the road R2.

8. The system of claim 7, wherein one or more of the datasets are georeferenced.

9. The system of claim 7, wherein the datasets are presented using a translation mechanism adapted to a receiver's construction trade.

10. The system of claim 7, wherein the altering is performed to reduce one or more environmental impacts related to the road R2.

11. The system of claim 7, wherein the altering is performed for one or more of manufacturing activities, production activities or road works activities for the road R2.

12. The system of claim 7, wherein the best practices are related to one or more of environmental impacts and regional guidelines.

13. A non-transitory computer-readable medium storing a set of instructions for improving one or more road quality indexes, the set of instructions comprising:
one or more instructions that, when executed by one or more processors of a device, cause the device to:
for each road R1 from a plurality of roads, obtain two or more datasets comprising:
design data related to a design phase of the road R1;
construction data related to a construction phase of the road R1;
maintenance data related to maintenance activities performed at one or more moments in a lifecycle of the road R1;
inspection data related to inspections performed at one or more moments in the lifecycle of the road R1;
testing data related to tests performed regarding the road R1; and
environmental data related to environmental measurements performed at one or more moments in the lifecycle of the road R1; and
derive one or more best practices related to at least one of road construction and road maintenance considering, for the plurality of roads, the obtained datasets for the environmental data, the testing data, the inspection data, the maintenance data, the construction data and the design data;
during an intervention being performed on a road R2:
gather intervention data during field activities;
compute a suggestion from the intervention data using a predictive model and the best practices; and
alter one or more execution parameters of the intervention based on the suggestion;
wherein the gathering, the computing and the altering is performed in real-time;
wherein the intervention is one of construction, maintenance or testing at the road R2; and
wherein the execution parameters include at least one of:
a choice of material for the road R2;
a construction technique for the road R2;
a maintenance technique for the road R2; and
a design choice for one or more structures of the road R2.

14. The non-transitory computer-readable medium of claim 13, wherein one or more of the datasets are georeferenced.

15. The non-transitory computer-readable medium of claim 13, wherein the datasets are presented using a translation mechanism adapted to a receiver's construction trade.

16. The non-transitory computer-readable medium of claim 13, wherein the altering is performed to reduce one or more environmental impacts related to the road R2.

17. The non-transitory computer-readable medium of claim 13, wherein the altering is performed for one or more of manufacturing activities, production activities or road works activities for the road R2.

18. The non-transitory computer-readable medium of claim 13, wherein the best practices are related to one or more of environmental impacts and regional guidelines.

* * * * *